Dec. 20, 1949     E. H. GRAFTON     2,491,728

BEARING

Filed Aug. 1, 1944

EUGENE HILL GRAFTON, INVENTOR,

BY Alan Franklin

ATTORNEY.

Patented Dec. 20, 1949

2,491,728

UNITED STATES PATENT OFFICE 2,491,728

BEARING

Eugene Hill Grafton, Huntington Park, Calif.

Application August 1, 1944, Serial No. 547,556

7 Claims. (Cl. 308—174)

My invention relates to ball and roller bearings in which the rolling balls or rollers are within cup-shaped right and left twin-shell casings and within these shells is a stationary bearing or axle upon which the stationary curved annular raceways are formed which are a part of the complete bearings of the shells and of the axle combined. The inside of the shells are so formed to furnish curved ball or roller raceways or surface bearings for the rolling balls or rollers as the revolving shells roll around the axis, be the axle vertical or horizontal.

The purpose of my invention is to provide a bearing whose provisions will be: a bearing hermetically sealed from dirt and foreign substance detrimental to long life and unlimited wear and to retain the oil; a bearing of high efficiency that is self-oiling and dust-proof; a ball or roller bearing that requires no servicing; a ball or roller bearing with longer life than those heretofore made; a bearing that requires no further attention or oil during service once filled with a lubricant when assembled.

Another purpose of my invention is to provide a bearing, particularly a ball or roller bearing, of the very highest efficiency that will simultaneously provide for and take up both lateral and rotary forces of any revolving wheel, disc or spindle, be their rotation vertical or horizontal or angular; a bearing that will be self-contained and one that will run in any position; a bearing that the axle can be held at rest with the hub in motion or a bearing that the hub can be held at rest with the axle in motion; a bearing that secures perfect alignment at any angle; a bearing that can be made of any length and any diameter to suit conditions; a bearing complete which needs to be fitted only to the stationary and revolving parts of its application; a bearing with the rolling ball or roller contact above its axis and the bearing surface journal or ball or roller raceway having opposite contact below its axle simultaneously; a bearing whose rolling balls or rollers act as lubricating deflectors reversing the course of the lubricant centripetally and automatically, in the direction of its axis, to be forced back to the inner periphery by centrifugal force and reacted upon; a ball and bearing journal integral or a roller and ball bearing integral acting simultaneously in which the weight or pressure upon the bearing surfaces are divided. Experiments have shown in the ball and frustum bearing when running with light pressure a greater part of the work or bearing forces are on the rolling balls and when running with heavy pressure the rolling balls are protected from surface granulation by the frustum part of the integral bearing, surface, increasing the life, duration and stability of a ball bearing.

On the axle of the double ball race bearing (Fig. 1) of my invention is formed two opposed ball races of spaced relation to each other with their surface diameter greater than those of their companion races within the twin shells or hub, which axle admits of being solid or having a hole through the center longitudinally. The curved ball races are adjustable to take up wear by means of packing thin flat rings between the twin shells. To adjust bearings add such thickness of rings as may be required. By this construction a very fine adjustment can be obtained so that the rolling balls can be seated to fit in their companion races.

The receptacle within the hub is designed to hold a lubricant of sufficient quantity for continuous running without refill.

Other objects and advantages will appear hereinafter as this specification progresses.

The invention is illustrated in the annexed drawing, which forms a part of this specification and in which.

Figure 4:
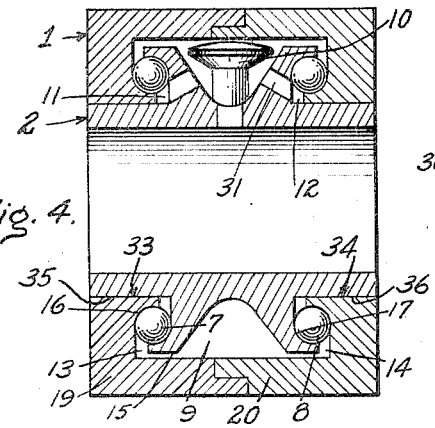
Fig. 4 is a longitudinal section of my invention taken on line 4—4 of Fig. 1.
Figure 1:
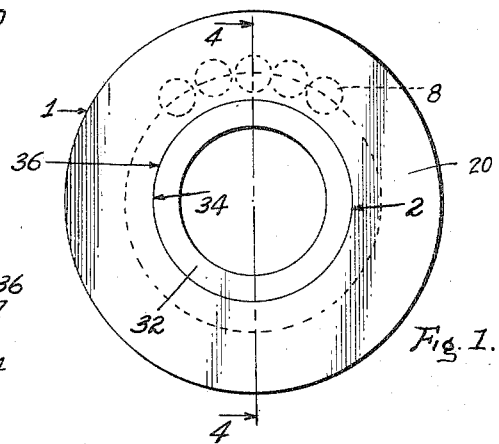
Fig. 1 is an end view of my invention.
Figure 5:
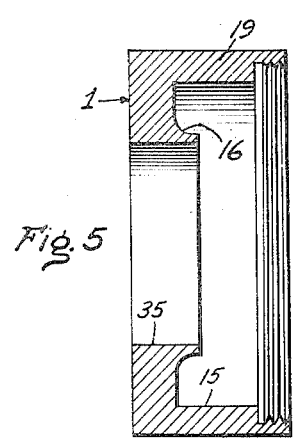
Fig. 5 is a longitudinal section of one of the twin shells of the bearing member of my invention taken on line 5—5 of Fig. 2.
Figure 2:
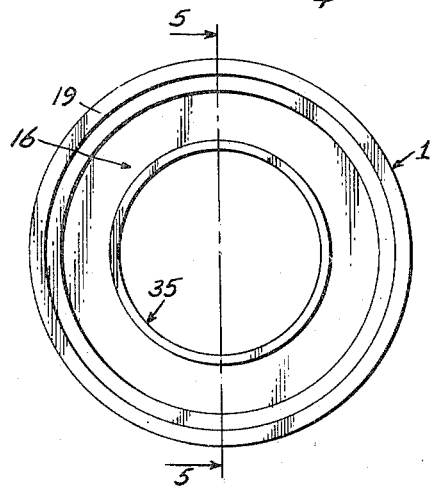
Fig. 2 is an inner end view of one of the cup-shaped twin shells of the bearing member of my invention.
Figure 6:
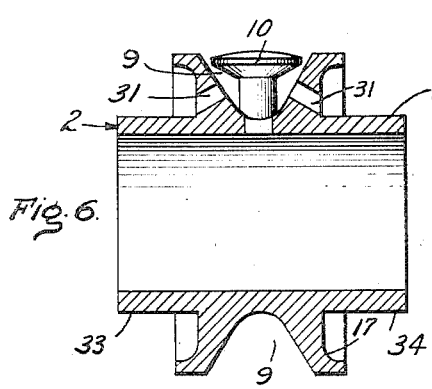
Fig. 6 is a longitudinal section of the journal member of my invention taken on line 6—6 of Fig. 3.
Figure 3:
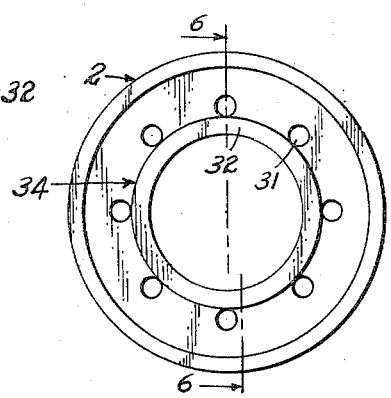
Fig. 3 is an end view of the journal member of my invention.

Referring to the drawing my invention in its present embodiment comprises a pair of twin shells forming a bearing member 1 and an axle forming a journal member 2 within these shells. Bearing means, about to be described, are interposed between said journal member and said bearing member within said bearing member. On this axle are a pair of ball races and rolling balls 7 and 8 in opposed angular relation to each other. In the center between ball races made in the axle or stationary member, is provided a deep groove 9 with a deflector 10 to retard the circuity and change the course or the direction of the lubricant, confined within said bearing member, by forcing the lubricant through holes 31 to the ball races 11 and 12, the nearest point of these races to the axle and by centrifugal force in the revolutions the lubricant is carried through the ball races to points 13 and 14 and then to the inner periphery 15 to be taken up again by the deflector 10 to complete another cycle of operation. The ball races for the rolling balls are so formed and constructed that their pressure bearing points 16 and 17 are below or under their revolving axis when the pressure or weight carried is on top of the cup shape twin shells or casing 19 and 20 of the bearing member 1; viz, as it would be if these cup shape twin shells 19 and 20 were the hub of an electric trolley wheel sheave. These pressure bearing points 16 and 17 below the axis are particularly in the oil reservoir 9 when at rest (static) and in the best oil circulating position when in motion (dynamic). Within the groove 9 and through each side near the short diameter are the holes 31 which are oil holes through which the lubricant passes from said groove 9 to the small chambers 11 and 12. This is accomplished by obstructing the circuity of the fluid by means of deflector 10 which circuity is caused, through centrifugal force and by adhesion to inner periphery 15 in the revolving hub. The external cylindrical surfaces 33 and 34 of the hub 32 of the journal member 2, and the internal cylindrical surfaces 35 and 36 of the cup-shaped twin shells 19 and 20, respectively, of the bearing member 1 are not bearing surfaces, although the surfaces 35 are in close contact with the surfaces 33 and 34 to seal the lubricant within the bearing.

I claim:

1. A bearing including a journal member, a bearing member surrounding and turnably fitted on said journal member in sealing contact therewith, said bearing member being formed with an internal annular bearing chamber for holding a lubricant sealed therein, annular bearing races on said journal member extending into said bearing chamber, annular bearing races on said bearing member in said bearing chamber in opposed angular relation to said bearing races on said journal member, bearing elements between the bearing races on said bearing member and said journal member opposing both radial and lateral loads, said journal member being provided with an annular reserve lubricating groove between the bearing races on said journal member and opening into said bearing chamber in said bearing member, said journal member being also provided with outlets leading from opposite sides of said lubricating groove into the bearing races at opposite sides, respectively, of said groove, for circulating lubricant between said bearing races and said bearing elements between said races.

2. A bearing as claimed in claim 1 including a lubricating deflector in the lubricating groove for forcing lubricant from said groove into the bearing races through the outlets leading from the groove into said bearing races.

3. A bearing as claimed in claim 1 including a lubricating deflector in the lubricating groove for forcing lubricant from said groove through the outlets leading from said groove into said bearing races, said deflector being formed with a head at its outer end.

4. A bearing including a journal member formed with an external annular lubricating groove and a pair of annular bearing races at the sides, respectively, of said groove, said journal member being also formed with holes leading from said groove into said races, respectively, a bearing member surrounding said journal member and turnably fitted on said journal member in sealing contact therewith, said bearing member being formed with an internal annular bearing chamber into which extends said bearing races with the outer peripheral edges of said races spaced from the outer peripheral wall of said bearing chamber, said bearing member being formed in two sections with their outer peripheral chamber walls secured together in sealing relation, said sections being formed with annular bearing races positioned within said bearing races, respectively, of said journal member, and bearing elements between the races of said journal member and said bearing member in rolling contact with said races.

5. A bearing as claimed in claim 4 including a deflector secured in said journal member in the lubricating groove for forcing lubricant from said groove through the holes leading from said groove into the races at the sides of the groove.

6. A bearing including a journal member, a bearing member surrounding and turnably fitted on said journal member in sealing contact therewith, said bearing member being formed with an internal annular bearing chamber, a bearing in said bearing chamber including an annular race member formed on said bearing member and an annular bearing race member formed on said journal member and surrounding said annular race member on said bearing member, and bearing elements confined between said race members in rolling contact therewith, and said bearing chamber containing a lubricant sealed therein for lubricating said bearing elements and said race members, said journal member being formed with an external annular lubricating groove which opens into said bearing chamber for containing said lubricant in said bearing chamber, and said journal member being provided with holes leading from said groove into the bearing in said bearing chamber, through which holes lubricant is fed from said groove into said bearing.

7. A bearing as claimed in claim 6 including a deflector secured in said journal member and extending into said groove for forcing lubricant from said groove through said holes into said bearing.

EUGENE HILL GRAFTON.

REFERENCES CITED

The following references are of record in the file of this patent:

UNITED STATES PATENTS

| Number | Name | Date |
| --- | --- | --- |
| 422,723 | Cartensen | Mar. 4, 1890 |
| 581,710 | Gardner | May 4, 1897 |
| 772,022 | Brinley | Oct. 11, 1904 |
| 827,171 | McKown | July 31, 1906 |
| 1,242,153 | Dickerhoff | Oct. 9, 1917 |
| 1,312,683 | Crawford | Aug. 12, 1919 |
| 1,563,013 | Brunner | Nov. 24, 1925 |
| 1,591,395 | McNeely | July 6, 1926 |
| 1,685,517 | Baldwin | Sept. 25, 1928 |
| 2,149,974 | McCormack | Mar. 7, 1939 |
| 2,179,860 | Panzegrau et al. | Nov. 14, 1939 |
| 2,396,623 | Thurston | Mar. 12, 1946 |